(12) United States Patent
Elie et al.

(10) Patent No.: US 8,750,847 B2
(45) Date of Patent: Jun. 10, 2014

(54) METHOD OF MASKING AN IDENTIFIER OF AT LEAST ONE DESTINATION OF A CALL, AND A CORRESPONDING DEVICE AND COMPUTER PROGRAM

(75) Inventors: Stéphane Elie, Pedernec (FR); Loïc Pieto, Rospez (FR)

(73) Assignee: Orange, Paris (FR)

( * ) Notice: Subject to any disclaimer, the term of this patent is extended or adjusted under 35 U.S.C. 154(b) by 113 days.

(21) Appl. No.: 13/497,409

(22) PCT Filed: Sep. 22, 2010

(86) PCT No.: PCT/FR2010/051990
§ 371 (c)(1),
(2), (4) Date: Mar. 21, 2012

(87) PCT Pub. No.: WO2011/039451
PCT Pub. Date: Apr. 7, 2011

(65) Prior Publication Data
US 2012/0220280 A1    Aug. 30, 2012

(30) Foreign Application Priority Data
Sep. 29, 2009 (FR) ..................................... 09 56768

(51) Int. Cl.
*H04M 3/42* (2006.01)
(52) U.S. Cl.
USPC ........ 455/415; 455/414.1; 455/416; 455/417; 455/418; 455/466; 455/566; 379/142.01; 379/142.02; 379/142.05; 379/201.1; 379/201.11

(58) Field of Classification Search
USPC .............. 455/414.1, 415, 416, 417, 418, 466, 455/566; 379/142.01, 142.02, 142.05, 379/201.1, 201.11
See application file for complete search history.

(56) References Cited

U.S. PATENT DOCUMENTS

| | | | | |
|---|---|---|---|---|
| 5,058,152 | A  * | 10/1991 | Solomon et al. ............. | 379/67.1 |
| 5,907,604 | A  * | 5/1999 | Hsu ........................... | 379/142.06 |
| 7,664,242 | B2 * | 2/2010 | Finkelman et al. ...... | 379/142.02 |
| 8,135,119 | B1 * | 3/2012 | Zhao et al. ............... | 379/142.05 |
| 8,254,541 | B2 * | 8/2012 | Cai ........................... | 379/142.05 |
| 2002/0120874 | A1 * | 8/2002 | Shu et al. ..................... | 713/201 |
| 2005/0097171 | A1 * | 5/2005 | Hikichi ........................ | 709/204 |
| 2007/0011245 | A1 | 1/2007 | Kawashima et al. | |
| 2007/0081649 | A1 * | 4/2007 | Baudino et al. .......... | 379/201.11 |
| 2008/0089501 | A1 * | 4/2008 | Benco et al. ............. | 379/142.01 |
| 2009/0274283 | A1 * | 11/2009 | Jain et al. ................. | 379/142.01 |

FOREIGN PATENT DOCUMENTS

WO    WO 01/27724 A1    4/2001

* cited by examiner

*Primary Examiner* — Olumide T Ajibade Akonai
(74) *Attorney, Agent, or Firm* — Drinker Biddle & Reath LLP

(57) ABSTRACT

A method of setting up a call between a user and at least one destination comprises, prior to setting up the call, a masking stage for masking the identifier, which stage comprises the following steps, for at least one destination: intercepting an identifier of the destination as input by the user; and modifying a signal including the identifier and used for displaying the identifier, or for setting up said call.

14 Claims, 3 Drawing Sheets

METHOD OF MASKING AN IDENTIFIER OF AT LEAST ONE DESTINATION OF A CALL, AND A CORRESPONDING DEVICE AND COMPUTER PROGRAM

CROSS-REFERENCE TO RELATED APPLICATIONS

This application is the U.S. national phase of the International Patent Application No. PCT/FR2010/051990 filed Sep. 22, 2010, which claims the benefit of French Application No. 09 56768 filed Sep. 29, 2009, the entire content of which is incorporated herein by reference.

FIELD

The field of the invention is that of systems for communication between a user and at least one destination. More precisely, the invention is applicable to managing the identifier of one or more call destinations.

The invention may be applied in particular to new and future techniques associated with a set of terminals (telephone, computer, TV, . . . ) organized as a local network in which it is possible to display the characteristics of a call made over the local network on all of the terminals of the system.

More precisely, the invention may find an application in situations in which it is possible from one communications terminal to verify or monitor the various calls that are in progress. Such a situation occurs when a user has a plurality of wireless or cordless terminals, each possessing a screen, for example.

BACKGROUND

Over the last few years there has been a great increase in the number of terminals capable of setting up a call with at least one destination. There are fixed telephones suitable for setting up at least one telephone call. The most recent telephone terminals, whether fixed or mobile, also present multiple functions, and in particular a large screen making it possible to set up a video conference with a destination, or indeed to write short messages using the short message service (SMS) messaging service.

Furthermore, use of the Internet, which has become commonplace or even essential both in the home and in professional surroundings, has also given rise to increasing numbers of applications that require a large screen on terminals suitable for setting up a call with at least one destination.

For example, reference may be made to fixed terminals that have a "large" screen separate from the terminal, such as models that make use of touch screen technologies. Such touch screens are incorporated in particular in products such as: Open Peak®, Verizon Hub®, or indeed Home Manager® from AT&T, which are "all-in-one" products dedicated to a home communications network capable simultaneously of performing functions specific to a telephone (whether fixed or mobile), to a TV set, to a computer, . . . .

From an ergonomic point of view, the advantage of those communications systems using a large screen is that when the user sets up a call, the identifier of the third party is visible on the screen of the terminal being used by the user. However since the size of these screens is becoming ever greater, if the user seeks to keep the identifier of the third party confidential, then the user faces a problem associated with the screens being easy for someone else to view.

According to the inventors, in the near future, it will be possible to view (or monitor) ongoing calls from all of the pieces of equipment in a home network (television, computer, . . . ). It will then be impossible to keep an outgoing call confidential without people looking at the TV or a computer becoming aware of the call.

A terminal 10 having a large screen 12 is shown diagrammatically in FIG. 1. Conventionally, a user seeking to set up a call with at least one destination uses a keypad to input (E1) the identifier ID corresponding to the destination, e.g. the number 10 04 33 06 72. The identifier ID is then processed (E2) by a processor module 13 incorporated in the terminal 10 (and shown outside the terminal solely for the purpose of clarifying the way the user is put into communication with the destination). Conventionally, the processor module 13 stores the call identifier in a history of the calls made by the terminal and sends (E3) the identifier to the large screen in order to display the identifier of the destination of the call. In the example shown in FIG. 1, the large screen displays the number of the destination, and it may also display its identity (forename, surname) or indeed other information associated with the destination.

For example, assuming there are n (where n is an integer) terminals within a home, shown in FIG. 2 as being connected to the same local network and displaying simultaneously information about ongoing calls, a user seeking to organize an anniversary surprise for his or her spouse, for example, is not only obliged to hide away to avoid being seen or heard by his/her spouse, but must also isolate the n−1 other terminals that display information associated with the call that is to be kept secret and that is being made by using an originating terminal on which the user is dialing the call. Such an operation can be difficult if the terminals are large, or even impossible if the terminals are too large.

Furthermore, even if the user manages to carry out this operation, it is still necessary for no trace of the call to remain, whether within the terminal or indeed within the equipment of the communications operator.

The inventors have not identified any presently existing solution that can be used to solve the problem associated with keeping the destination of a call confidential.

SUMMARY

The invention proposes a novel solution that avoids the above drawbacks of the prior art, the solution being in the form of a method of setting up a call between a user and at least one destination.

According to the invention, such a method comprises, prior to setting up said call, a masking stage for masking the identifier, which stage comprises the following steps, for at least one destination:

intercepting an identifier of the destination as input by said user; and modifying a signal including said identifier and used for displaying said identifier, or for setting up said call.

Thus, the invention makes it possible to mask the identity of the destination of the call from other users of the terminal. The invention performs such masking by modifying the signal that includes the identifier such that the modified identifier cannot be interpreted by some other user.

The invention may be implemented from a terminal that does not have display means, in which case the user seeks merely to mask the identifier of the destination in the network call log or in the bill.

In a particular implementation of the invention, said user has at least one terminal including display means for displaying an identifier of at least one call destination, and said modification step includes a step of replacing at least one character making up said identifier in said signal with at least one masking character, thereby delivering a masked identifier, and it further includes a step of displaying said masked identifier via said display means of said terminal.

Thus, the invention enables the identity of the destination of the call to be masked on the calling terminal, and also on the other terminals of the home network that might reveal this information, said other terminals being provided with display means, e.g. such as screens. The invention thus makes it possible for the call made by the user to be kept confidential.

Furthermore, the method of the invention seeks to enable the destination to be masked for various different types of call. The term "call" is used to cover putting into communication in a broad sense: sending an SMS, video conference, instant messaging, email, etc. A user commonly has a panoply of communications systems. For example, the user may make a telephone call either with a fixed terminal or with a mobile terminal.

The user may also communicate via an email service. The user may also "chat" via instant Internet messaging services. It is also possible to consider a user having an instant conversation with a plurality of other users.

According to the invention, the user may also mask the identity of the called third party(ies) on the terminal the user is using and also on a plurality of terminals in a network with that terminal.

Furthermore, the invention makes it possible to perform partial or total masking of the screen of the terminal being used. Considering the example of a telephone number, the invention makes it possible to mask that number in various different ways, including:

replacing at least one digit of the called number with an "X";
totally masking the screen; and
masking at least one line of the screen display, i.e. a line corresponding to the line with the telephone number.

According to a particular characteristic, the method of the invention further comprises a step of deleting said identifier input by said user in a call history of said terminal and/or of replacing it with said masked identifier.

Thus, the invention makes it possible to avoid leaving traces on the calling terminal of the call that has been made therefrom. The invention makes it possible to erase the trace of the call from a call log, or indeed from an instant communication history, or indeed from an email history, or indeed from the user's bill.

In a particular aspect of the invention, said method further comprises an activation stage for activating said masking stage.

Thus, the invention makes it possible to avoid systematically masking identifiers (e.g. numbers) input by the user, while reserving the possibility of such masking for certain particular circumstances.

More particularly, said activation stage comprises a step of transmitting signaling information about said activation to a communications network entity.

This signaling information may be inserted in a signal during the step of putting the user into communication with the destination.

Thus, by means of this signaling information, the destination third party can identify the person making the call, and may optionally be informed about the caller's desire to keep the call confidential within the caller's home. Furthermore, the communications network used by the user's terminal is informed of the user's desire to keep the identity of the called third party confidential.

In a particular implementation of the invention, said activation stage includes a step of automatic engagement regardless of the identifier of said destination.

Thus, the invention enables a user to opt for called-party identities to be kept confidential permanently. Such an implementation may be required by a user having a profession that makes it necessary to keep the identities of all clients confidential (bodyguards, secret agents, luxury hotels).

In another particular implementation, said activation stage comprises a step of the user engaging the method for a plurality of successive calls.

Thus, the invention enables the user to engage the masking of destinations for a plurality of calls. In particular when setting up an event such as a surprise, a user attempting to call several parties or actors in an event will activate identity masking at the beginning of a series of telephone calls (or communications of any other type) and will deactivate masking once that series of calls (or other types of communication) has been completed.

In another particular implementation, said activation stage comprises a step of the user engaging the method on request.

Thus, the user can decide whether or not to activate the method on a call-by-call basis, depending on requirements.

In another particular aspect, said activation stage comprises a step of the user inputting an activation prefix into said terminal.

Input may be performed by keying in or by touching a touch screen or it may be voice input. When using a touch screen, the user need not input the prefix, since pressing on a predetermined (virtual) key suffices to activate the service and to generate the necessary activation prefix automatically. The activation prefix may be a code selected by the user, e.g. the head of the household. In another implementation, it may be assumed that the activation prefix is determined by default on the terminal, or indeed by the network of the operator.

The use of voice input makes it possible to implement voice recognition to identify the speaker. Thus, it is possible to prevent certain users from making use of call masking by recognizing the voice of a user attempting to mask the identifier of a called third party. Under such circumstances, the activation step is deactivated if the identified speaker does not satisfy a predetermined identification setting. For example, if an underage child of the home is identified, the method of the invention is deactivated even if the child knows the activation prefix. Thus, the identifier of the destination of a call made by the child will appear at least on the screen and in the call history of the terminal.

In a particular and optional aspect of the invention, said activation stage may be ignored if said identifier corresponds to a destination for which a call from the user is subject to a surcharge.

Thus, the invention makes it possible for the user to control the activation of destination identifier masking if the destination appears in a list of special identifiers for which access is subject to surcharging. For example, if a user sets up a telephone call to a number that corresponds to a surcharged call, then the method of the invention may ignore the masking request if the called number appears in a list of numbers previously specified as being surcharged or if the code of the number is specific to an international call or indeed to a special services number (08 in mainland France).

More particularly, the method of the invention further comprises the following steps:
- a communications network entity receiving a communications signal exchanged between a user and at least one destination, said signal including signaling information about activation of masking for an identifier of said at least one destination; and
- masking said identifier of said at least one destination of said call within a database of said communications network entity, the data in the database being representative of calls made by said user.

Thus, in the invention, activating destination identity masking internally also causes the identity of the destination to be masked in the database. For example, masking the destination of the call is incorporated in the operator's database, so that the operator will draw up a bill in which the identifier of the destination is masked.

The invention also provides a terminal.

According to the invention, such a terminal comprises means for setting up a call and means for masking the identifier of a destination, said means comprising:
- means for intercepting a destination identifier input by said user; and
- means for modifying a signal including said identifier and for use in displaying said identifier, or in setting up said call.

In a particular embodiment of the invention, said terminal includes means for displaying an identifier of at least one destination of a call, and said modification means comprise means for replacing at least one character making up said identifier in said signal with at least one masking character, so as to deliver a masked identifier. Said terminal also includes means for displaying said masked identifier on said display means of said terminal.

Such a terminal is adapted in particular to implement the above-described method of setting up a call. For example, it may be a terminal of the fixed or mobile radio telephone type, a fixed or portable computer, a personal digital assistant (PDA), or indeed a TV set connected to a home communications network.

The invention also relates to a communications signal between a user and at least one destination, the signal including signaling information about activation of a mask for preventing at least one display field being viewed (partial masking of a screen), referred to as the hidden display field, on the display means and in the storage means of a terminal of said user.

Naturally, the signal may include the various characteristics relating to the method of the invention.

Finally, the invention provides a computer program including instructions for implementing the method of the invention when the program is executed by a computer.

BRIEF DESCRIPTION OF THE DRAWINGS

Other characteristics and advantages of the invention appear more clearly on reading the following description of a particular embodiment given merely by way of illustrative and non-limiting example, and of the accompanying drawings, in which.

DETAILED DESCRIPTION

General Principle

The general principle of the invention relies on setting up a call between a user and at least one destination in a manner that enables the user to control the broadcasting of the identity of the desired destination. According to the invention, identity of the destination for a call may be:
- masked on the display means of the communications terminal;
- erased from the call history; and/or
- masked within a database incorporated in a communications network entity, e.g. having the task of billing calls made and/or of listing calls made, e.g. once a month.

Thus, the invention makes it possible to erase all traces of a destination of a call and to do so all the way up to the billing issued by the telecommunications operator.

Figure 2:
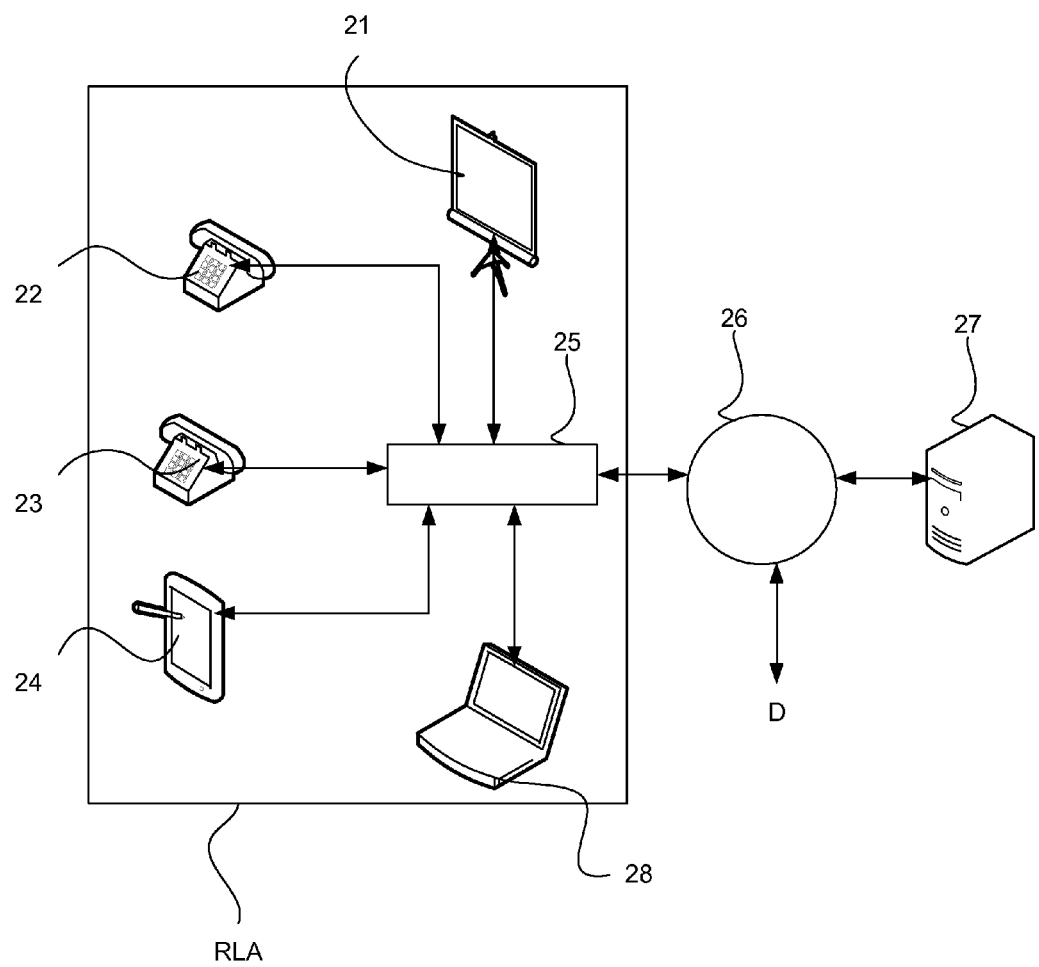
FIG. 2 shows a system in which the method in a particular implementation of the invention is used.

An example of a system in which the method of the invention can be implemented is described below with reference to FIG. 2. In this system, a home local network $RL_A$ of a user A (not shown in FIG. 2) is shown. With reference to FIG. 2, two terminals, e.g. two wired or wireless (cordless) telephone handsets 22 and 23 are connected to the home network $RL_A$ and are provided with large screens (not shown in FIG. 2). The other terminals 21, 28, and 24 of the home network $RL_A$ may also be taken into consideration. These two handsets associated with a single telephone line can communicate with each other and with the other terminals in communication with the home local network $RL_A$, e.g. via a local network management module 25.

These two handsets make it possible in particular to manage telephone calls in a practical manner. In the event of an incoming call reaching the home of user A, an appropriate distribution of handsets within the home enables the user A to limit the amount of movement required in order to answer the call. Furthermore, the terminals 22 and 23 may also be cordless and connected to a base making it possible for the user A to move them about, depending on requirements.

With reference to FIG. 2, the mobile telephone 24, the optionally portable computer 28, and the TV set 21 are also connected to the network $RL_A$ via the local network management module 25. These terminals are suitable for broadcasting information about current calls sent from the network.

The local network management module 25, commonly referred to as a "box" (e.g. comprising a home gateway), may communicate in application of various techniques with the terminals forming part of the network $RL_A$. These techniques may in particular belong to the group comprising:
- voice over an Internet protocol (IP) network, known as "voice over IP" (VoIP), which is a technique that enables voice communications to be made over the Internet or any other network that accepts the transmission control protocol/Internet protocol (TCP/IP). This technology is used in particular for supporting the telephony over IP (ToIP) service;
- WiFi, a registered trademark for a wireless computer network technology that was originally devised for operating as an internal network and that has subsequently become means for broadband access to the Internet, based on the IEEE 802.11 standard (ISO/CEI 8802-11);
- Bluetooth, using a short-range radio technology for simplifying connections between electronic appliances and designed for the purpose of replacing cables between computers and printers, scanners, keyboards, mice, video-game joysticks, mobile telephones, PDAs, hands-free kits and systems, car radios, digital cameras;

Ethernet, a packet-switched local network protocol;

digital enhanced cordless telephone (DECT, previously known as Digital European Cordless Telephone), a digital cordless telephone standard for home or business use in the 1880 megahertz (MHz) to 1900 MHz frequency range (microwaves), nowadays used mainly for voice communications;

etc.

The home local network $RL_A$ communicates with a public network 26. Thus, user A communicates with a destination third party D by means of a call passing over the public network 26.

Furthermore, the public network 26 is also connected to a network entity containing a database 27 used for storing data representative of calls made by the user in a communications network entity. For example, the database may be used by a telephone network operator or by an Internet network operator.

In an embodiment that is not shown, it is also possible to consider that the system of the invention makes use of a small home local network connected to the public switched-telephone network (PSTN).

Such PSTN terminals (not shown), like the terminals 21, 22, 23, 24, and 28, have screens that have until now displayed the identifier of the destination D of a call made by the user A.

Thus, if user A seeks to call a restaurant D in order to book a table for the purpose of celebrating a wedding anniversary, and seeks to surprise his or her spouse, it is necessary for the user to be prudent and to take many precautions in order to guarantee the surprise effect. Achieving a surprise assumes that user A acts out of the sight of his/her spouse and ensures that his/her spouse is not looking at any terminal having a screen on which information is displayed about the identity of the destination. This can be difficult if it is necessary to prevent his/her spouse from seeing the screens of any of the fixed or mobile telephones, the TV, and any fixed or portable computer, and to do so without drawing attention to the subterfuge.

The invention proposes a novel method of setting up a call from user A to destination D that makes it possible to control the extent to which information concerning the destination is broadcast to other people.

It is not obvious how to achieve this in the prior art, which does not disclose any technique that makes it possible to keep a destination anonymous. Developments in present and indeed future technologies are more directed to making as much information as possible available in real time, as opposed to hiding it. The invention provides for masking the identifier of the destination and it is used so as to make it possible to keep the identifier of the destination secret.

Description of an Implementation of the Invention within the Terminal

Figure 3:
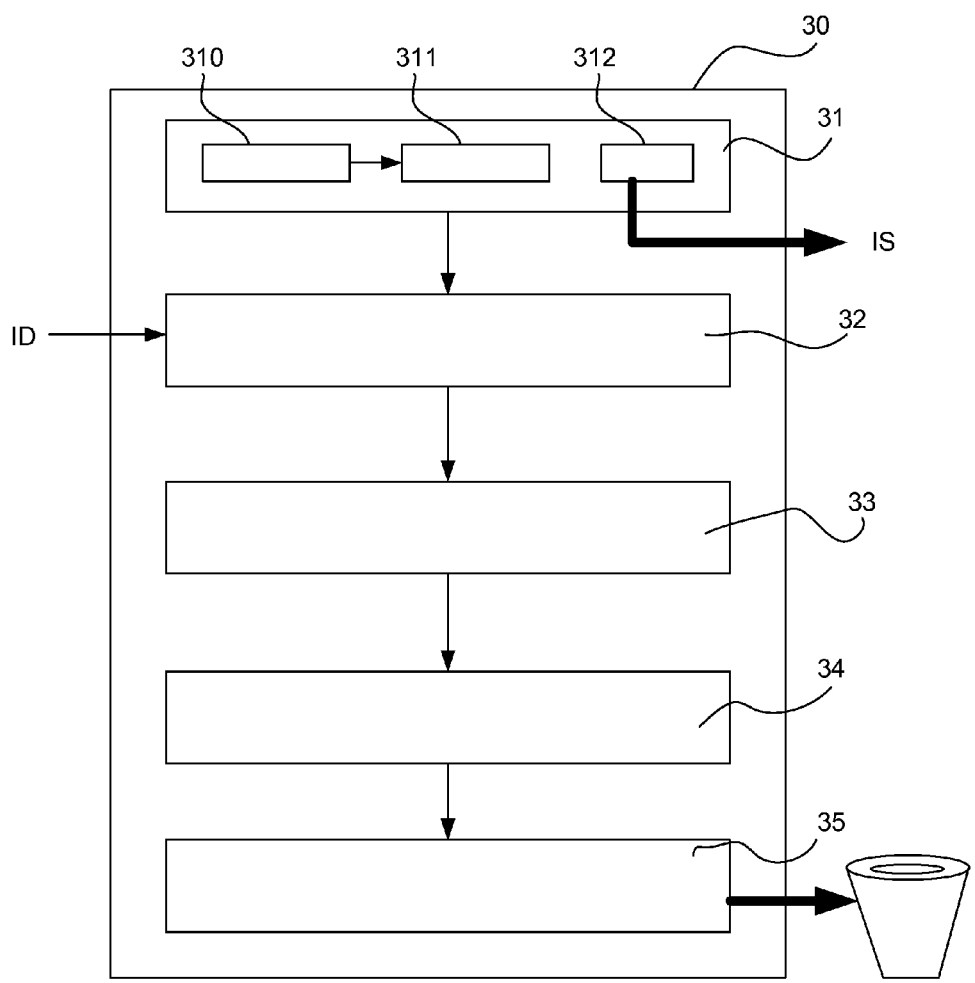
FIG. 3 shows the main steps of the method in an implementation of the invention in a system as shown in FIG. 2.

FIG. 3 shows the main steps of the method (30) in an implementation of the invention in a system as described above (FIG. 2).

It is thus assumed that a user A of the terminal seeks to make a call to a destination D. For example, user A seeks to organize an anniversary surprise.

Thus, user A activates (31) the method of the invention for masking the identity of the called party. The activation step (31) includes a step of inputting (310) an activation prefix into the terminal, thereby engaging (311) activation of a masking stage of the method 30 of the invention.

This input step may be performed by voice or by keying in. The use of voice input may also implement voice recognition for the purpose of identifying the speaker (the calling user).

Thus, it is possible for example to prevent a user from masking the identifier of a party that the user is calling. User A may have previously identified a set of potential users of home telephones and may have input the characteristics of each of them.

Thus, when the invention uses voice input, it implements a voice recognition step, and it is therefore capable of identifying a user who is not entitled to mask destinations, in application of a predetermined setting. For example, it may be assumed that user A has set the system so as to prevent a child living at home from masking an identifier. Thus, a child is prevented from engaging the masking of the identifier of the destination. This precaution may be found necessary, e.g. for the purpose of limiting access of children to particular Internet sites or telephone lines.

Thus, the invention makes it possible to increase the effectiveness of parental control within a home.

Furthermore, user A may also engage destination identifier masking for a plurality of successive calls, e.g. using a prefix that is keyed in via the terminal.

For example, it is possible to engage the activation of masking during a first call and to release that activation after the last call has been made.

The prefix may correspond to a code made up of several characters. Depending on the implementation of the invention, this code may be set by the operator, set by default within the terminal, or indeed set at will by the user A.

In other implementations, it is possible for engagement to take place automatically whatever the destination identifier. In other words, that would amount to permanent masking of the identifiers of all destinations.

Activation may be released by inputting the same prefix another time, or by inputting some other prefix.

This automatic engagement may be performed by using dual-tone multifrequency (DTMF) codes that correspond to combinations of frequencies that are used in modern telephony, or indeed by means of a voice server, or even the Internet.

Another implementation may also enable engagement to be performed call by call, i.e. requiring a prefix to be input for activating masking whenever required by the user A, with release taking place automatically at the end of each call.

Furthermore, said activation stage (31) also implements a stage (312) of transmitting signaling information $I_S$ about said activation to a communications network entity.

By means of this signaling information, inserted in the communications signal, the user A may also inform the destination D such as the database 27 (of the system shown in FIG. 2) of the user's desire to mask the identity of the called third party, whether this is to take place within the home or indeed in the billing issued by the communications operator.

Furthermore, this information may warn the third party D of the desire of user A to mask the call from other people. This signaling option thus enables the destination D to be warned of the desire for discretion that the calling user seeks for the call being made. More particularly, this information may be transmitted to the destination in the form of a voice message prior to the call being set up or possibly when presenting the calling user's call to the called third party.

Once the masking stage has been activated (31) by inputting (310) an activation prefix that generates engagement (311), the user continues by inputting the identifier ID of the destination to be called.

The method of the invention then implements a step of intercepting (32) the previously input identifier ID and of replacing (33) at least one of the characters making up said identifier by means of at least one masking character. Thus, if by way of example the identifier ID corresponds to the number 10 04 33 06 72, that identifier may be replaced in the invention by a masked identifier XX XX XX XX XX, or indeed by a combination obtained in random manner 33 XX 17 AB 89, or indeed by a screen that goes blank (black or white).

Furthermore, the identifier may also be recognized, and if it corresponds to a destination for which calls from the user are surcharged, then activation of the masking stage is ignored by the terminal.

Thus, access to Internet sites, or to surcharged telephone numbers cannot be erased from the screen and/or the call log of the terminal, and/or furthermore from the bill delivered by the communications operator, thus making it possible to keep control over the identifiers of surcharged calls from the home.

In the implementation shown in FIG. 3, the terminal displays (34) the masked identifier using the display means of the terminal.

Finally, the terminal also proceeds with deleting (35) the identifier input by the user A from a call history of said terminal. For example, if the user A is using a terminal corresponding to a telephone handset, the identifier, and in a particular implementation all trace of the call to the call destination that it is desired to keep hidden, is/are deleted from the call log of the telephone used by the user A.

In an embodiment that is not shown, it is also possible to consider using terminals that do not have display means for the purpose of implementing the invention in order to mask the identifier of the destination, e.g. in a call log belonging to the network or indeed in a bill for the user.

Description of an Implementation of the Invention within a Communications Network Entity In an implementation that is not shown, a network entity containing a call database 27 receives a signal about a call exchanged between a user A of the method of the invention and a destination D.

Said entity is informed by the signaling information $I_S$ inserted in the communications signal in accordance with the invention that the user A making the call has activated the masking stage.

Said entity then proceeds accordingly by indicating that the identifier ID of the destination of the call should be masked within the database representing calls from said user.

Consequently, the network entity will deliver a call history or a bill that keeps the destination of said call anonymous.

Structure of a Terminal of the Invention

Figure 1:
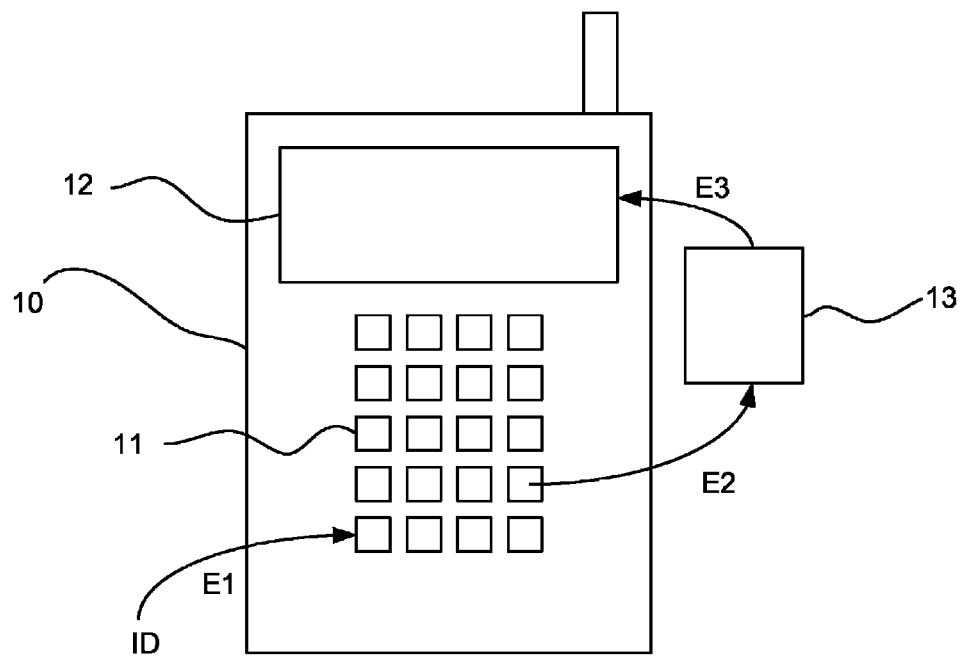
FIG. 1 shows a terminal as described above with reference to the prior art.
Figure 4:
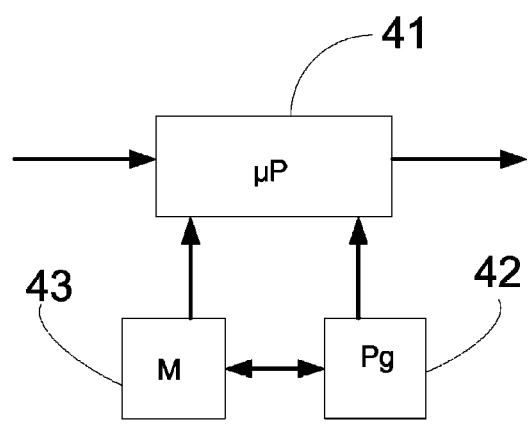
FIG. 4 shows the structure of a communications device for communicating between a user and at least one destination in a particular embodiment of the invention.

Finally, there follows a description with reference to FIG. 4 of the simplified structure of a terminal that implements identifier masking in accordance with the invention.

Such a terminal has a memory 43 constituted by a buffer memory M, a processor unit 41, e.g. having a microprocessor μP, and controlled by a computer program Pg 42, which program implements the method of the invention for setting up a call.

On initialization, the code instructions of the computer program 42 are loaded, by way of example, into a random access memory (RAM) prior to being executed by the processor of the processor unit 41. The processor unit 41 receives as input a prefix for activating said masking stage. The microprocessor of the processor unit 41 implements the steps of intercepting the identifier of the destination as input by said user, of replacing at least one character constituting said identifier of said destination with at least one masking character, of delivering a masked identifier, and of displaying said masked identifier using said display means of said terminal (when the terminal has such display means), in application of the instructions of the computer program 42 in order to decide whether each of the received identifiers is to be stored in the terminal or deleted. For this purpose, in addition to the buffer memory 43, the terminal includes means for masking the identifier of at least one destination of a call and comprising for at least one destination: means for intercepting a destination identifier input by said user, and means for replacing at least one character making up said identifier of said destination with at least one masking character so as to deliver a masked identifier. These means are controlled by the microprocessor of the terminal 41.

In a particular embodiment, the terminal includes means for displaying an identifier and means for displaying said masked identifier using said display means of said terminal.

The invention claimed is:

1. A method of setting up a call between a user and at least one destination, said method comprising, prior to setting up said call, a masking stage for masking the identifier, which stage comprises the following steps, for at least one destination:
   intercepting an identifier of the destination as input by said user; and
   modifying a signal including said identifier, including a step of replacing at least one character making up said identifier in said signal with at least one masking character, thereby delivering a masked identifier, used for displaying said identifier, or for setting up said call, such that the modified identifier cannot be interpreted by some other user.

2. The method according to claim 1, wherein said user has at least one terminal including display means for displaying an identifier of at least one call destination, and in that it further includes a step of displaying said masked identifier via said display means of said terminal.

3. The method according to claim 2, further comprising a step of at least one of (a) deleting said identifier input by said user in a call history of said terminal, and (b) replacing it with said masked identifier.

4. The method according to claim 1, further comprising an activation stage for activating said masking stage.

5. The method according to claim 4, wherein said activation stage comprises a step of transmitting signaling information about said activation to a communications network entity.

6. The method according to claim 4, wherein said activation stage comprises a step of automatic engagement regardless of the identifier of said destination.

7. The method according to claim 4, wherein said activation stage comprises a step of the user engaging the method for plurality of successive calls.

8. The method according to claim 4, wherein said activation stage comprises a step of the user engaging the method for the next call.

9. The method according to claim 7, wherein said activation stage comprises a step of the use inputting an activation prefix into said terminal.

10. The method according to claim 4, wherein said activation stage is ignored if said identifier corresponds to a destination with which the call presents a predetermined characteristic.

11. The method according to claim 1, further comprising the following steps:
   a communications network entity receiving a communications signal exchanged between a user and at least one destination, said signal including signaling information about activation of masking for an identifier of said at least one destination; and masking said identifier of said at least one destination of said call within a database of said communications network entity, the data in the database being representative of calls made by said user.

12. A terminal including means for setting up a call, said means comprising:

means for intercepting a destination identifier input by a user; and means for modifying a signal including said identifier, said modifying means including means for replacing at least one character making up said identifier in said signal with at least one masking character so as to deliver a masked identifier to be displayed or to be used in setting up said call, such that said masked identifier cannot be interpreted by another user.

13. A non-transitory computer program product comprising instructions for implementing a method according to claim 1 when the program is executed by a processor.

14. The method according to claim 10, wherein the predetermined characteristic is surcharging.

\* \* \* \* \*